United States Patent

[11] 3,597,042

[72] Inventor Maurice Favre
 Paris, France
[21] Appl. No. 816,131
[22] Filed Nov. 5, 1968
[45] Patented Aug. 3, 1971
[73] Assignee CSF Compagnie Generale de Telegraphie Sans Fils
 Paris, France
[32] Priority Nov. 21, 1963
[33] France
[31] 954,528
 Continuation of application Ser. No. 412,661, Nov. 20, 1964, now abandoned.

[54] APPARATUS FOR VIEWING PICTURES IN APPARENT 3D EFFECT
 2 Claims, 7 Drawing Figs.
[52] U.S. Cl. .................................................. 350/144, 350/132, 352/43, 352/86
[51] Int. Cl. .................................................. G02b 27/22
[50] Field of Search .................................................. 350/131, 132, 144; 352/229, 43, 86

[56] References Cited
 UNITED STATES PATENTS

| | | | |
|---|---|---|---|
| 2,218,875 | 10/1940 | Parsell | 350/132 X |
| 2,268,351 | 12/1941 | Tanaka | 350/144 X |
| 2,301,254 | 11/1942 | Carnahan | 350/132 X |
| 2,623,433 | 12/1952 | Stipek | 350/132 X |
| 2,885,927 | 5/1959 | Riker | 350/144 X |
| 2,891,440 | 6/1959 | Barake | 350/144 X |
| 3,226,867 | 1/1966 | Newton, Jr. | 350/144 X |

FOREIGN PATENTS

| | | | |
|---|---|---|---|
| 208,797 | 12/1923 | Great Britain | 350/144 |
| 708,644 | 5/1954 | Great Britain | 352/239 |

*Primary Examiner*—David Schonberg
*Assistant Examiner*—Paul A. Sacher
*Attorney*—Craig, Antonelli & Hill ABSTRACT: Method and device for viewing images, creating a depth sensation by masking a narrow vertical band on the left and right sides of the image, respectively, for the one and the other eye of the observer, by use of filtering devices, such as lateral bands made of complimentary colored material with appropriate spectacles for the viewer, or polarizing material with spectacles for the viewer, or of purely optical selectors without spectacles as double array of narrow opaque strips or transparent plates bearing prismatic lens gratings. The invention also provides for optical division of the entire picture in vertical narrow strips, horizontal translation in opposite directions of the odd and even strips, and selection for each eye of the two pictures thus created and shifted by usual filtering means including the masking of a narrow vertical band on the left and right sides of the respective images for the respective eyes of the observer.

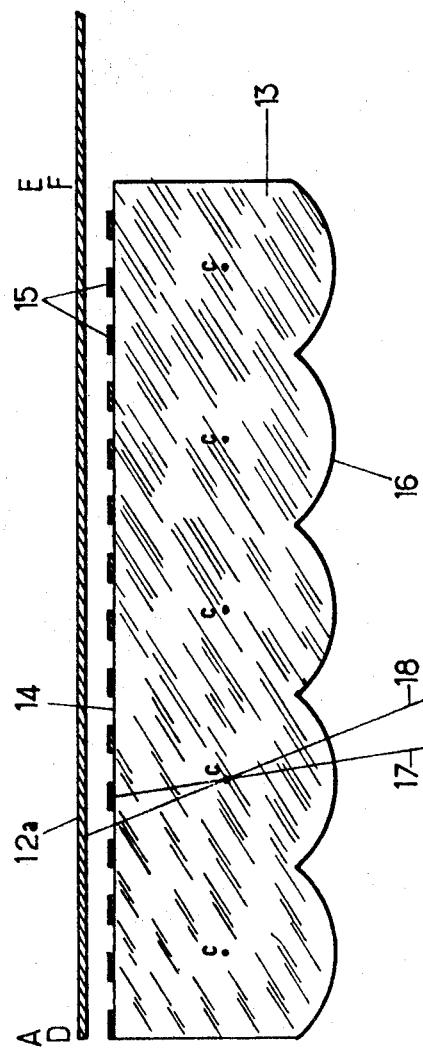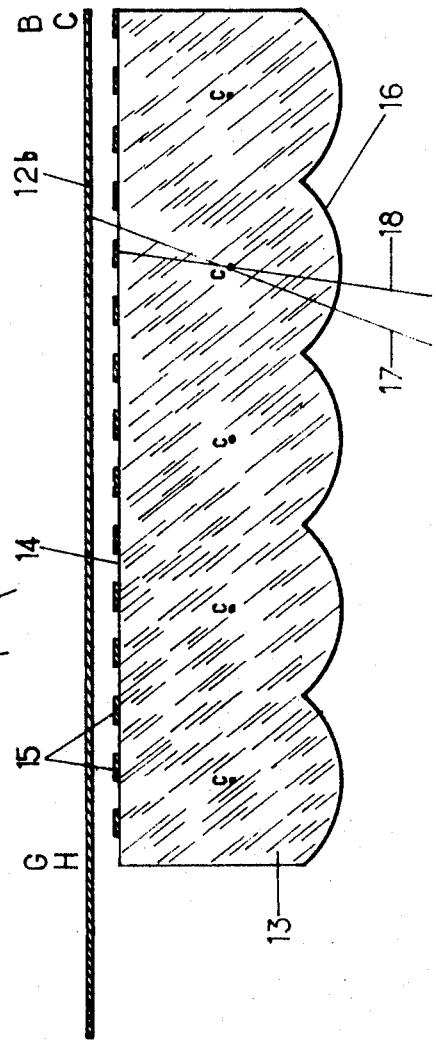

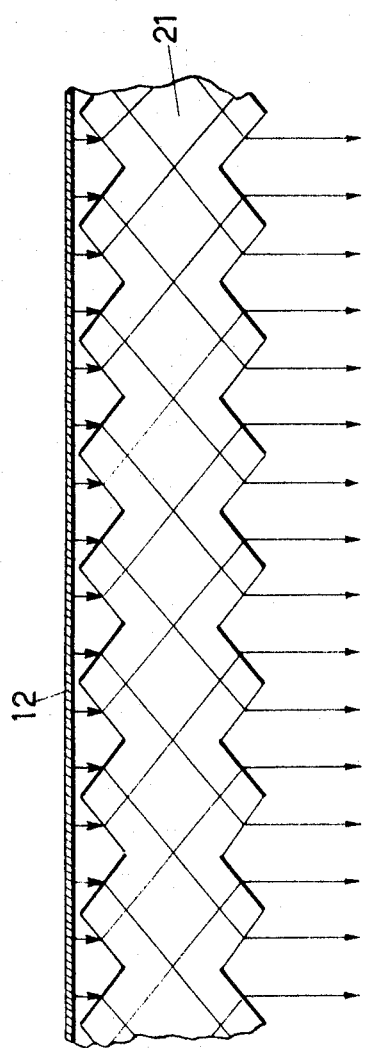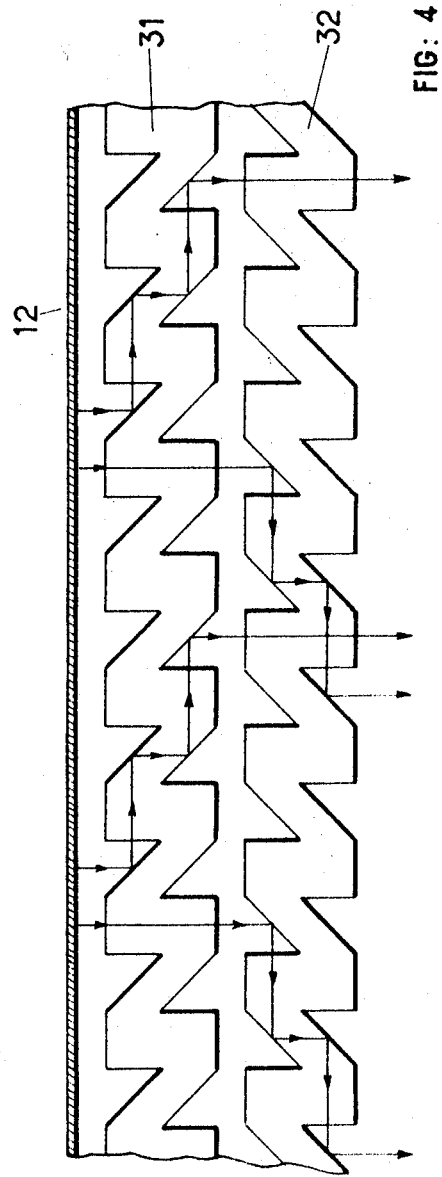

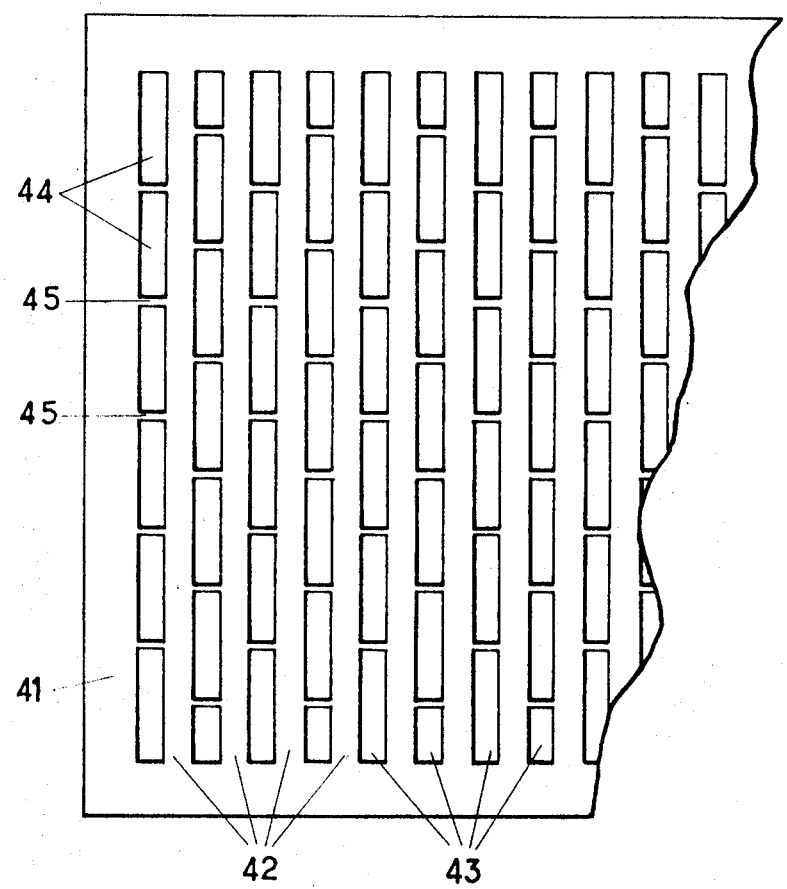
FIG: 6

APPARATUS FOR VIEWING PICTURES IN APPARENT 3D EFFECT

This is a continuation of application Ser. No. 412,661, filed Nov. 20, 1964, now abandoned.

The present invention relates to a method and apparatus for viewing images, and more particularly relates to a depth simulation method and apparatus for viewing plane images.

If one observes pictures representing on a plane surface objects with three dimensions (photography, cinematography, television, etc.) one realizes that these pictures lack relief.

The stereoscopic technique, known for quite some time, reestablishes the sensation of relief by the use of two pictures representing the same subject from two different points of view, separated by an interval of 6 to 7 cm., corresponding to the interval of or distance between the two eyes. An appropriate arrangement permits each eye of the viewer to see only one or the other picture respectively, and this selective observation reconstitutes in the human brain a single picture, giving the sense of volume or three dimension.

The present invention has for its object a method and novel means making it possible to produce a sensation of relief in the examination of single plane pictures, that is, taken from a single point of view.

It is known, as a psychophysiological phenomenon, that if a flat picture is observed through a frame located at some distance before it, the elements of the picture seem to be staggered in depth behind the frame, giving a "3D" illusion. This phenomenon is known as "window effect" and results essentially from the fact that the frame masks a part of the picture respectively a vertical band on the left side masked for the left eye, and on the right side for the right eye. In the following, to avoid confusion with true stereoscopy, this effect will be referred to as "depth simulation."

According to the present invention, one obtains a picture giving the sensation of depth (depth simulated image) from a picture with the aid of devices, essentially optical in nature, realizing the masking of a narrow vertical band on the left and right sides of the picture, respectively, for the one and the other eye of the viewer, in order to realize the same result as a real frame.

Under these conditions, one notes effectively that the picture observed gives the impression of having depth whereas this sensation disappears as soon as one stops the masking.

According to one aspect of the present invention, the lateral bands to be masked are covered by different filtering plates and the viewing is rendered selective by different complementary filters, placed in front of the eyes of the viewer.

According to another aspect of the present invention, the lateral bands of the image are covered by transparent plates carrying narrow opaque strips, separated by narrow intervals. The opaque strips may be provided on the two faces of the plates or only on the face adjacent the picture, in which case one imparts to the other face a lens aspect. In both cases, the disposition is such that the vision is rendered possible within the transparent intervals between opaque strips by one eye only for the right band of the picture and by the other eye only for the left band.

According to a still further aspect of the present invention the picture examined is optically decomposed into two pictures, spaced horizontally in opposite directions with respect to the initial image, while an optical selector permits each eye of the viewer to view only one or the other of the two pictures, respectively, the vision being limited, by a mask, to a field excluding the left lateral band of the left picture and the right lateral band of the right picture.

Accordingly, it is an object of the present invention to provide a method and apparatus which permit the effect of three-dimensional viewing with plane pictures.

Another object of the present invention resides in the method of and apparatus for realizing such methods, which are simple and easy to realize, yet provide a good stereoscopic effect with pictures taken only from a single point.

A further object of the present invention resides in a depth simulation method for viewing planar pictures and in simple apparatus permitting the realization of such method.

These and further objects, features and advantages of the present invention will become more obvious from the following description when taken in connection with the accompanying drawing which shows, for purposes of illustration only, several embodiments in accordance with the present invention and wherein FIG. 1 is a schematic perspective diagrammatic view, illustrating a feature in accordance with the present invention.

FIGS. 2a and 2b are partial cross-sectional views illustrating another feature in accordance with the present invention for realizing the depth simulated viewing of the plane pictures in accordance with the present invention.

FIG. 3 is a partial schematic view of a picture decomposer device utilizable with the present invention.

FIG. 4 is a partial schematic view, similar to FIG. 3, of still another modified picture decomposer device utilizable with the present invention.

FIG. 6 is a partial elevational view of a detail of an apparatus in accordance with the present invention permitting realization of the depth simulation method of the present invention.

Figure 1:
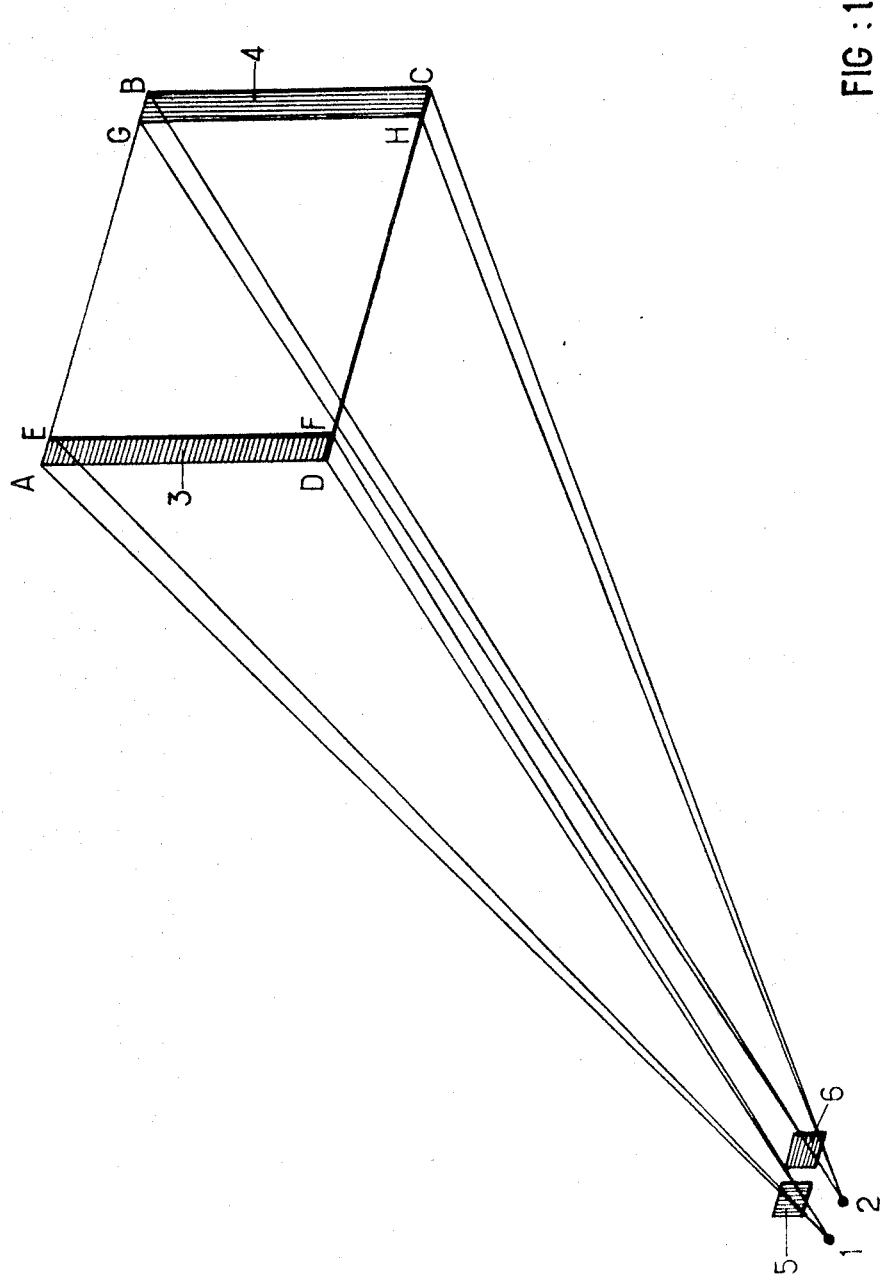

Referring now to the drawing wherein like reference numerals are used throughout the various views to designate like parts, and more particularly to FIG. 1, there is represented in this Figure a plane picture ABCD, reproducing a subject (objects, persons, etc.) having three dimensions, and placed in front of a viewer having two eyes represented by the points 1 and 2, 1 being the left eye and 2 being the right eye.

The vertical band AEFD, on the left side of the picture, and the band GBCH of the same size on the right side, are covered by "Polaroid" sheets 3 and 4. The term "Polaroid" is a trademark designating a filter material for polarization of light, provided in sheets of known composition. The Polaroid filters 3 and 4 have different polarizations. In FIG. 1, for example, there is indicated schematically for the filter 3 a horizontal polarization and for the filter 4, a vertical polarization. Two polaroids 5 and 6 are placed in front of the eyes of the viewer, for example, in the form of eye-glasses. The Polaroid 5 has a polarization perpendicular to that of the Polaroid 3. Under these conditions the left eye 1 does not see the band AEFD of the picture whereas it sees well the rest of the picture, that is the portion EBCF; similarly, the right eye 2 sees well the portion AGHD without seeing the lateral zone GBCH. In other words, the left band is masked only for the left eye and the right band is masked only for the right eye.

The selective masking thus realized has the effect to give to the viewer the impression that he has in front of him a picture in relief (image with three dimensions) of a subject situated to the rear of the plane of the initial picture.

In lieu of the filters providing light polarization, one may utilize color filters, by employing complementary filters (for example: red and green, blue and yellow, etc.) on the one hand, for the left band of the picture and the left eye of the viewer and, on the other hand, for the right band of the picture and the right eye of the viewer. One thus obtains the invisibility of each of the lateral bands for one or the other eye, respectively, and consequently a depth simulation of the observed image.

If one desires to obtain depth simulation without imposing on the viewer the wearing of filtering glasses, one places in front of the bands to be masked selective plates of the type indicated in FIGS. 2a and 2b. These Figures show in cross section the left portion of the picture at 12a (FIG. 2a) and the right portion of the same picture at 12b (FIG. 2b). The selective plates 13, made of transparent material, have on the side adjacent the picture, a plane face 14 covered by opaque strips or stripes 15, and on the opposite side, an undulated face 16, forming a large number of very small lenses on which there is indicated the optical centers at points c. With an appropriate dimensioning of the small lenses, of the strips 15 and of the intervals separating the strips, one achieves the condition wherein the rays coming from one eye fall on the opaque strips whereas those from the other eye pass through the transparent intervals. The band of the picture, covered by such a selective plate, is therefore visible for one eye and invisible for the other. Thus, one sees in FIG. 2a, showing the left portion of the picture, that the band AEFD is invisible for the left eye which views the same in the direction 17, intercepted by the opaque strips 15, and visible for the right eye according to the direction 18. The contrary takes place in FIG. 2b, representing the right portion of the picture. The latter is visible for the left eye according to the direction 17 and is invisible to the right eye according to the direction 18 which encounters opaque strips 15.

The masking of the lateral bands of a picture for one or the other eye, respectively, in order to obtain depth simulation according to the present invention, may also be made by utilizing a decomposition of the image and by translation or shifting thereof in the horizontal sense or direction to obtain a masking of the lateral portions thereof.

More precisely, these translations or shifting are applied to the observed picture in order to derive two pictures slightly shifted one with respect to another, in such a way that the left side of one is masked or hidden behind the left side of a fixed opaque frame placed in front of the apparatus, and that the right side of the other picture, in the same way, is masked behind the right side of said fixed opaque frame.

Among several methods and apparatus to obtain the derived pictures, a new one according to the invention consists in decomposing the original image in narrow strips, preferrably sufficiently narrow to not be individually visible at a normal viewing distance, and to translate or shift all the even strips, for example, in a horizontal direction, slightly to the right, and to shift the odd strips slightly to the left hand. This decomposing step must be followed by a second one: the enabling of each viewer's eye to see only one system of strips, that is the right hand translated system for the right eye, and the left hand translated system for the left eye. This is a selection step.

In FIG. 3, a decomposer is constituted by a plate of transparent material 21 with facets alternately inclined in two opposite directions. Since the plate 21 is placed in front of the plane of the picture 12, the latter finds itself divided into a number of sections or parts equal to the number of adjacent facets. All of the light rays, transversing the plate 21, are subjected therein to a double refraction, displacing the ones toward the left and the others toward the right. As a result thereof, a viewer, placed at a sufficiently large distance, sees the successive sections or parts of the picture displaced in alternate fashion toward the left and the right.

A similar effect is obtained by the device of FIG. 4 which comprises two plates of transparent material 31 and 32 composed of sections with facets parallel to the picture 12, alternating with sections or portions having facets inclined at 45° with respect to the plane of the picture. The noninclined facets of the plate 31 are placed opposite the inclined facets of the plate 32, and vice versa. All of the inclined facets are covered by a metallic layer, for example, silver, assuring a total or substantially total reflection. Under these conditions, the rays traversing the two plates 31 and 32 undergo four successive reflections at 45°. It follows therefrom that the sections or parts of the picture, adjacent to the noninclined facets of the plate 31, appear to the viewer displaced toward the left and all the sections of the picture adjacent the inclined facets of the plate 31, appear displaced toward the right.

Figure 5:
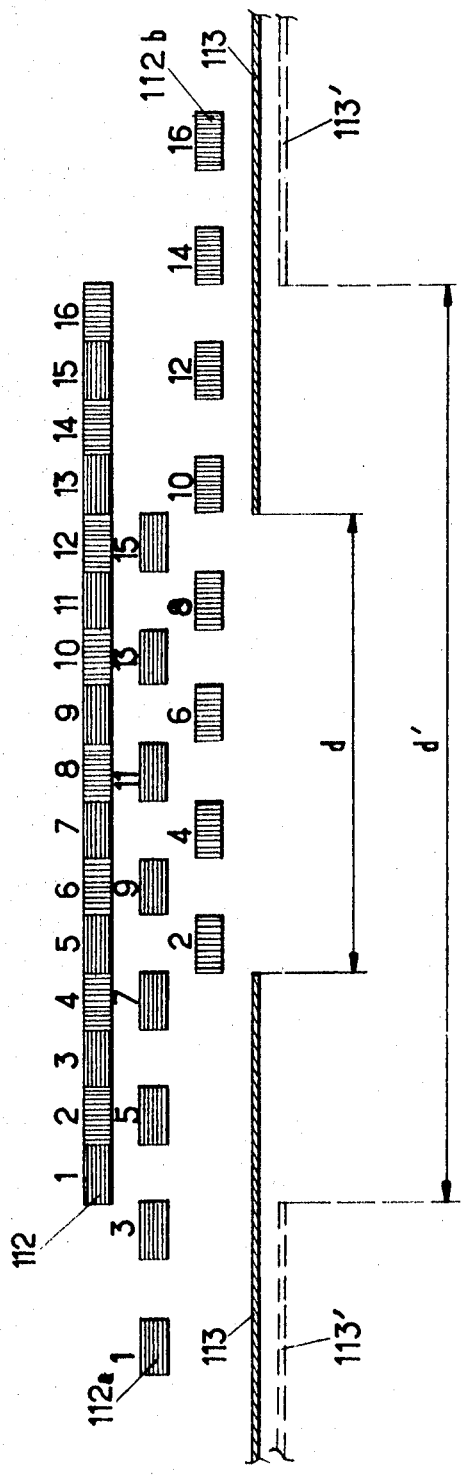
FIG. 5 is a schematic diagram illustrating the manner in which depth simulation may be obtained through the use in accordance with the present invention of a picture decomposer device.

The present invention wherein utilization of a decomposer for the masking of the lateral bands of a picture may be accomplished as illustrated in FIG. 5. In this Figure there is schematically represented, in cross section, a picture 112 decomposed into sections numbered 1 to 16, this number having been taken only to simplify the drawing, for in reality the number of sections is much higher.

The picture 112 is divided into two pictures 112a and 112b by a decomposer, which may take the form provided in FIG. 3 or that provided in FIG. 4. The picture 112a displaced toward the left, contains the sections 1, 3,...15 of odd order and the picture 112b displaced toward the right, contains the sections 2, 4,...16 of even order. A frame or masking means 113 is disposed in front of the observed image and limits the vision to a field excluding a band on the left side of the image 112a and on the right side of the image 112b.

The masking device 113, indicated in the drawing in full lines in this Figure, shows an aperture of width d, equal exactly to that of the common portion of the images 112a and 112b. Nevertheless, one may also utilize within the scope of the present invention a masking device with a larger aperture, up to value d', obtained with the mask 113' indicated in this Figure in dash lines, the dimensions d' being that of the initial image 112.

A selection device permits the left eye of the viewer to see only the left decomposed picture 112a and the right eye to see only the right decomposed picture 112b. The selection device utilized in combination with the image decomposer according to FIG. 5 may be of the one or other type described above in FIGS. 1, 2a and 2b: filters with light polarization, or with complementary colors, or selector lenses. Since the selection must apply then to the entire surface of the decomposed images, the filtering plates or lenses must cover the images in question in their entirety. As the two derived pictures are obtained by decomposing in narrow strips, it is obvious that the selection or filtering devices are also divided or decomposed in narrow elements of the same pitch arranged in flat array.

With a field of vision comprised between the value d and d' of FIG. 5, one thus obtains a depth simulated image. In effect, the picture 112 is split up into a picture 112a observable only by the left eye and a picture 112b observable only by the right eye due to the decomposer and selecting device; and, the left portion of the picture 112a finds itself masked for the left eye and the right portion of the picture 112b is masked for the right eye by the masking device 113. One then notes that, for the mechanism for the human vision, the different views offered to the two eyes are completed and combined to reconstitute in the brain of the spectator the initial image and add thereto the sensation of relief which was lacking therein.

With a decomposer cutting up the picture into the large number of very narrow sections, it is practical to utilize perforated filtering foils or sheets as indicated in FIG. 6. Each filtering foil or sheet 41 comprises bands 42, separated by intervals 43. The number of bands is equal to that of the visible sections on each decomposed image, that is, one-half of the sections cut by the decomposer of the initial image, the width of the bands 42 and of the intervals 43 being, of course, equal to that of the sections of the image. The intervals 43 are formed by rectangular apertures 44, leaving therebetween very thin small bands 45, which have as purpose to prevent an excessive mechanical weakening of the foil or sheet 41.

Two sheets, producing different filtering actions and perforated according to the principle of FIG. 6, must be placed in front of the decomposer with a reciprocal displacement of a section. The filtering bands 42 of the one are then opposite the intervals 43 of the other, and the presence of the small bands 45 practically causes no perceptible obturation by reason of their small dimensions.

It will also be noted that in the actual embodiments of the present invention, described hereinabove, one has effected the masking of the left band of the image for the left eye of the observer and the masking of the right band for the right eye. This mode of operation is the preferred mode of execution of the present invention but it is understood that the invention may equally be realized in the inverse manner, that is, by masking the left band of the image for the right eye of the observer and the right band for the left eye.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

I claim:

1. A device for producing a three-dimensional effect when viewing a single and plane picture, comprising first means for masking a narrow vertical band along one side of the picture for one eye of the viewer and second means for masking a narrow vertical band along the opposite side of the picture for the other eye of the viewer, said first and second means including a plate element covering each vertical band and having narrow opaque strips alternating with narrow transparent intervals, and means to enable viewing through the transparent intervals for one eye only on one plate element on one side and for the other eye only on the plate element of the other side.

2. A device according to claim 1, wherein each plate element is provided with opaque strips only on the side facing the picture, and lens means on the opposite side of each plate element.